US00RE38122E

(19) United States
(12) Reissued Patent
Kondo et al.

(10) Patent Number: US RE38,122 E
(45) Date of Reissued Patent: May 27, 2003

(54) MITER SAW

(75) Inventors: Masayoshi Kondo, Anjo (JP); Kouji Matsubara, Anjo (JP)

(73) Assignee: Makita Corporation, Anjo (JP)

(21) Appl. No.: 09/692,095

(22) Filed: Oct. 20, 2000

Related U.S. Patent Documents

Reissue of:
(64) Patent No.: 5,823,085
Issued: Oct. 20, 1998
Appl. No.: 08/720,838
Filed: Oct. 3, 1996

(30) Foreign Application Priority Data

Oct. 5, 1995 (JP) ..... 7-258784

(51) Int. Cl.[7] ..... B23D 45/14
(52) U.S. Cl. ..... 83/471.3; 83/473; 83/490; 83/581
(58) Field of Search ..... 83/473, 471.3, 83/490, 486.1, 432, 581, 471.1, 471.2, 468.3, 477.1, 563

(56) References Cited

U.S. PATENT DOCUMENTS 1,644,887 A * 10/1927 Mansfield
2,546,277 A * 3/1951 Schwandt
3,821,918 A * 7/1974 Niehaus et al.
4,245,533 A * 1/1981 Batson ..... 83/471.3
4,958,544 A * 9/1990 Miyamoto
5,181,448 A * 1/1993 Terpstra
5,207,141 A * 5/1993 Dehari ..... 83/471.3
5,249,496 A * 10/1993 Hirsch et al. ..... 83/471.3
5,392,678 A * 2/1995 Sasaki et al. ..... 63/471.3
5,437,214 A * 8/1995 Sasaki et al. ..... 83/471.3
5,524,516 A * 6/1996 Sasaki et al. ..... 384/49
5,582,089 A * 12/1996 Sasaki et al.
5,623,860 A * 4/1997 Schoene et al. ..... 83/471.3

FOREIGN PATENT DOCUMENTS

EP 570904 * 11/1993
JP 5-49301 * 6/1993
JP 5-49302 * 6/1993

OTHER PUBLICATIONS

U.S. patent application Ser. No. 09/167,301, filed Oct 6, 1998, Brunson et al.

* cited by examiner

*Primary Examiner*—Kenneth E. Peterson
(74) *Attorney, Agent, or Firm*—Dennison, Schultz & Dougherty

(57) ABSTRACT

A miter saw includes a miter saw for placing a work thereon, a miter saw unit having a saw blade mounted thereon, and a support mechanism for supporting the miter saw unit for rightward and leftward pivotal movement relative to the base. The support mechanism includes a first member on one side of the base and the miter saw unit and a second member on the other side of the base and the miter saw unit. The first member and the second member are pivotable relative to each other about a pivotal axis. A stopper mechanism is disposed between the first member and the second member for holding the miter saw unit in a vertical position. The stopper mechanism includes a first pressing member mounted on the first member, a first biasing member for biasing the first pressing member, and an abutting surface provided on the second member for abutment of the first pressing member. The abutting surface has a first recess formed therein. The pressing member is brought to automatically engage the first recess by the biasing force of the first biasing member when the miter saw unit is pivoted from a laterally pivoted position to the vertical position.

36 Claims, 11 Drawing Sheets

MITER SAW

Matter enclosed in heavy brackets [ ] appears in the original patent but forms no part of this reissue specification; matter printed in italics indicates the additions made by reissue.

*This application is a reissue of U.S. Pat. No. 5,823,085, which is based on application Ser. No. 08/720,838, filed Oct. 3, 1996.*

FIELD OF THE INVENTION

The present invention relates to a miter saw, and particularly to a miter saw having a miter saw unit which is pivotable laterally relative to a base from a vertical position to both right and left pivoted positions.

DESCRIPTION OF THE PRIOR ART

A conventional miter saw is operable to cut a work placed on a base with its saw blade positioned vertically relative to the base for a vertical cutting operation and with the saw blade inclined rightwardly or leftwardly relative to the base for an oblique cutting operation. A stopper mechanism is provided on the miter saw for determining the vertical position of the saw blade. Such a stopper mechanism is disclosed in Japanese Laid-Open Utility Model Publications Nos. 5-49301 and 5-49302.

The stopper mechanism of Publication No. 5-49301 includes a stopper pin for determining the vertical position of a miter saw unit relative to a base. The stopper pin is slidably supported by a saw unit side member which is pivotally mounted on a base side member. The stopper pin is insertable into and removable from an insertion hole formed in the base side member. When the stopper pin is inserted into the insertion hole, the miter saw unit is held in the vertical position. When the stopper pin is removed from the insertion hole, the miter saw unit is permitted to be laterally pivoted.

The stopper mechanism of Publication No. 5-49302 includes a stopper holder mounted on a base side member and a stopper fixed to a saw unit side member. The stopper holder is pivotable between a first position intervening a moving path of the stopper and a second position retracted from the moving path. The stopper may abut on the stopper holder in the first position, so that the vertical position of a miter saw unit can be determined. The stopper may not abut on the stopper holder in the second position, so that the miter saw unit can be laterally pivoted.

In order to determine a vertical position of a miter saw unit, stopper members may be fixed to a base side member and a saw unit side member, respectively, such that one of the stopper members abuts on the other when the miter saw unit is pivoted to the vertical position. This may provide rapid and reliable determination of the vertical position.

It is to be noted that, with this kind of miter saw unit having a miter saw unit which is pivotable laterally relative to a base from a vertical position to both right and left pivoted positions, such fixed stopper members cannot be used since the fixed stopper members may prevent the miter saw unit from moving from the right pivoted position to the left pivoted position via the vertical position or vice versa.

For this reason, the conventional stopper mechanisms described above incorporate the movable stopper pin and the movable stopper holder. However, the stopper pin and the movable stopper holder must be manually operated by an operator, so that the operation of the miter saw is very troublesome.

SUMMARY OF THE INVENTION

It is, accordingly, an object of the present invention to provide a miter saw which is simple in operation.

It is also an object of the present invention to provide a miter saw in which a vertical position of a miter saw unit can be reliably determined without a manual operation of a movable member.

According to the present invention, in a miter saw comprising a miter saw base for placing a work thereon, a miter saw unit having a saw blade mounted thereon, and a support mechanism for supporting the miter saw unit for rightward and leftward pivotal movement relative to the base, the support mechanism including a first member on one side of the base and the miter saw unit and a second member on the other side of the base and the miter saw unit, and the first member and the second member being pivotable relative to each other about a pivotal axis, the improvement comprising:

a stopper mechanism disposed between the first member and the second member for holding the miter saw unit in a vertical position;

said stopper mechanism including:

a first pressing member mounted on the first member;

a first biasing member for biasing the first pressing member; and an abutting surface provided on the second member for abutment of the first pressing member, the abutting surface having a recess formed therein;

the pressing member being brought to automatically engage the recess by the biasing force of the first biasing member when the miter saw unit is pivoted from a laterally pivoted position to the vertical position.

The invention will become more apparent from the appended claims and the description as it proceeds in connection with the drawings.

DETAILED DESCRIPTION OF THE PREFERRED EMBODIMENT

First to third embodiments of the present invention will now be explained with reference to the drawings.

The first embodiment of the present invention will be explained with reference to FIGS. 1 to 5.

Figure 1:
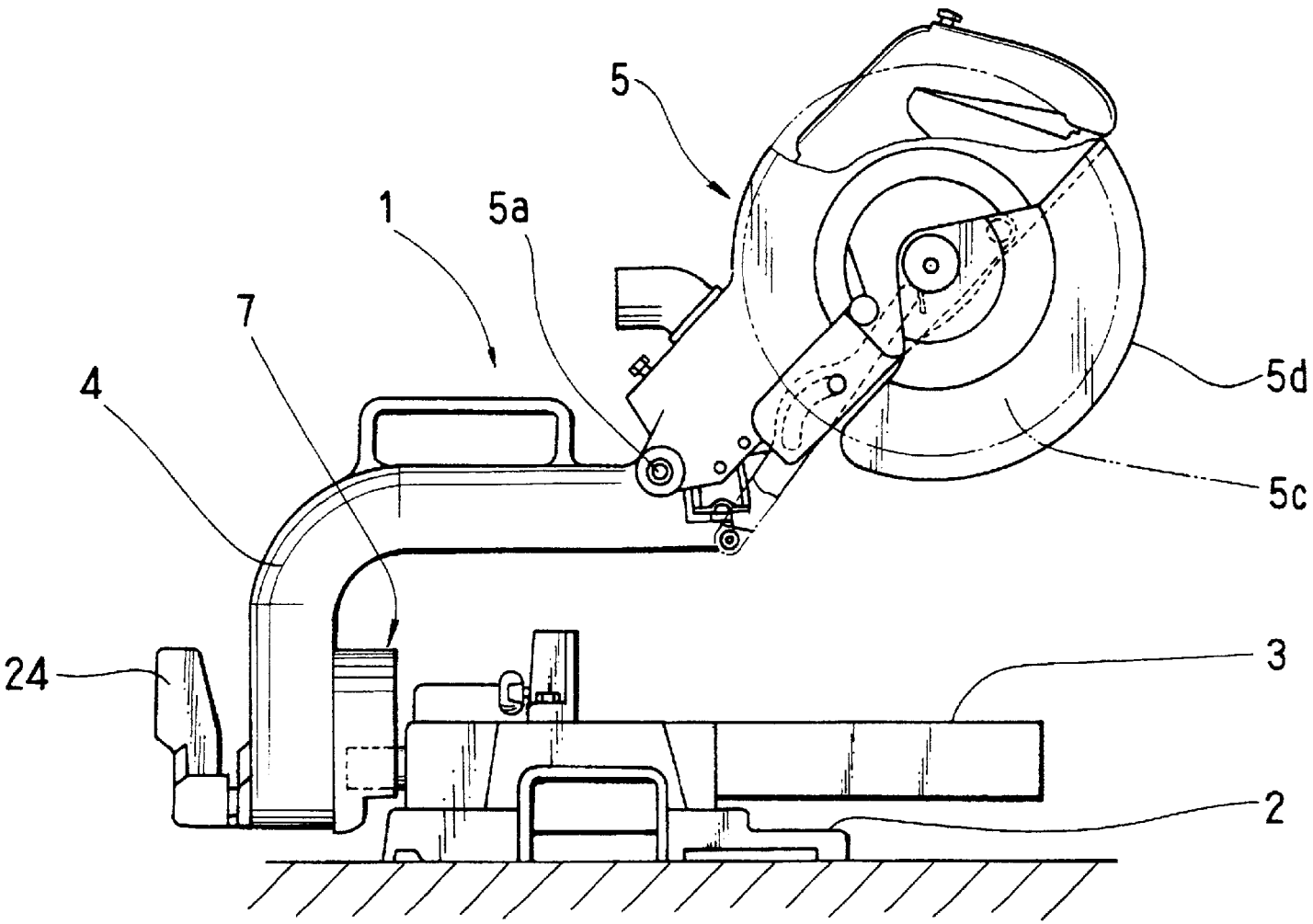
FIG. 1 is a side view of a miter saw according to a first embodiment of the present invention.
Figure 2:
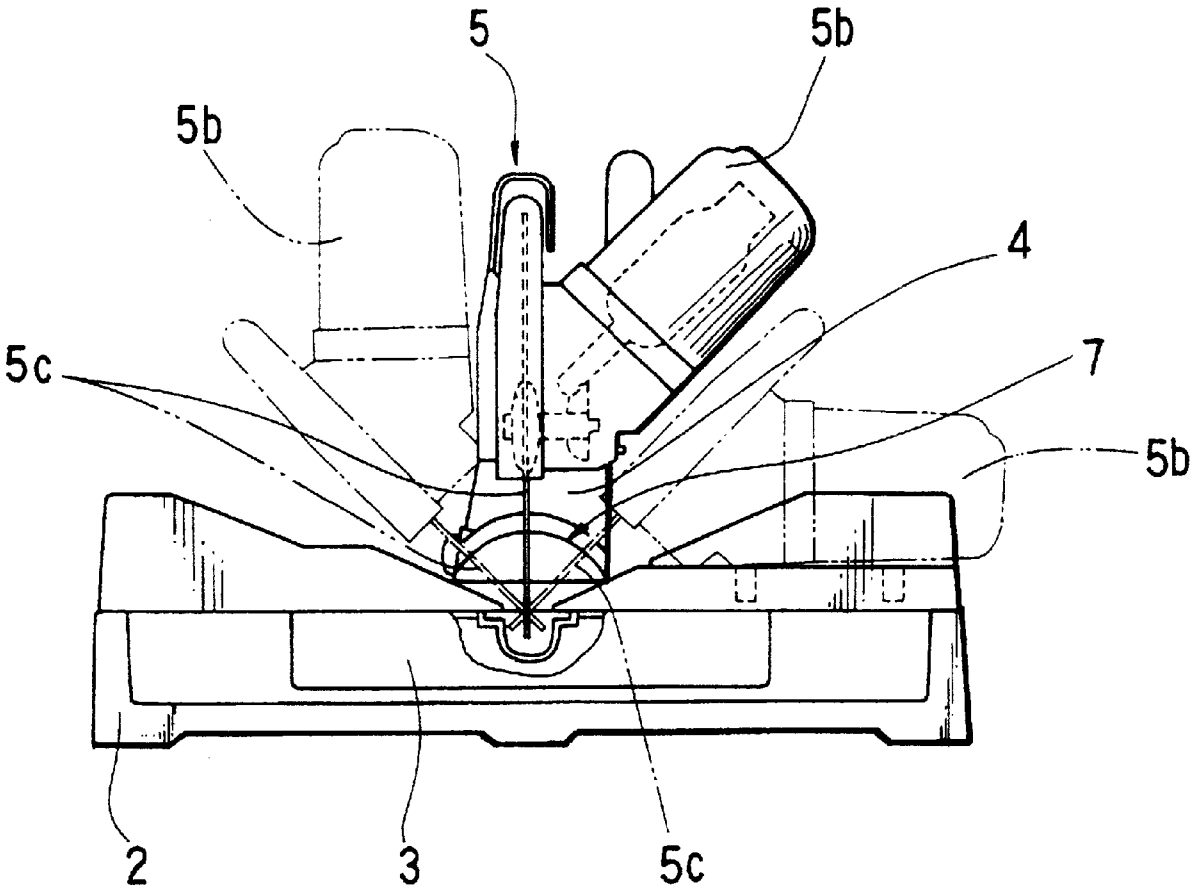
FIG. 2 is a front view of the miter saw and showing the state where the miter saw is pivoted in both right and left directions.

A miter saw 1 incorporating a stopper mechanism 10 is shown in FIGS. 1 and 2 in side view and front view, respectively.

The miter saw 1 generally comprises a base 2, a turntable 3 rotatably supported on the base 2, a support arm 4 supported for rightward and leftward pivotal movement on the rear portion (left side portion as viewed in FIG. 1) of the turntable 3 by means of a support mechanism 7, and a miter saw unit 5 mounted on a front end of the support arm 4 and is vertically pivotable relative to the support arm 4 about a fulcrum 5a.

The miter saw unit 5 in right and left pivoted positions is shown in FIG. 2 by chain lines. In a normal cutting operation, the miter saw unit 5 is held in a vertical position shown by solid lines or is held in a position within a left pivotal range. In a particular cutting operation, the miter saw unit 5 is held in a position within a right pivotal range. In this embodiment, a motor 5b is positioned on the right side of the miter saw unit 5, so that the right pivotal range is limited to about 45° to prevent interference between the motor 5b and the turntable 3.

A circular saw blade 5c is mounted on the miter saw unit 5 and is rotatably driven by the motor 5b. A safety cover 5d is mounted on the miter saw unit 5 so as to normally cover an exposed half of the saw blade 5c. The safety cover 5d is movable to uncover the exposed half of the saw blade 5c as the miter saw unit 5 is pivoted downwardly from its uppermost position.

Figure 3:
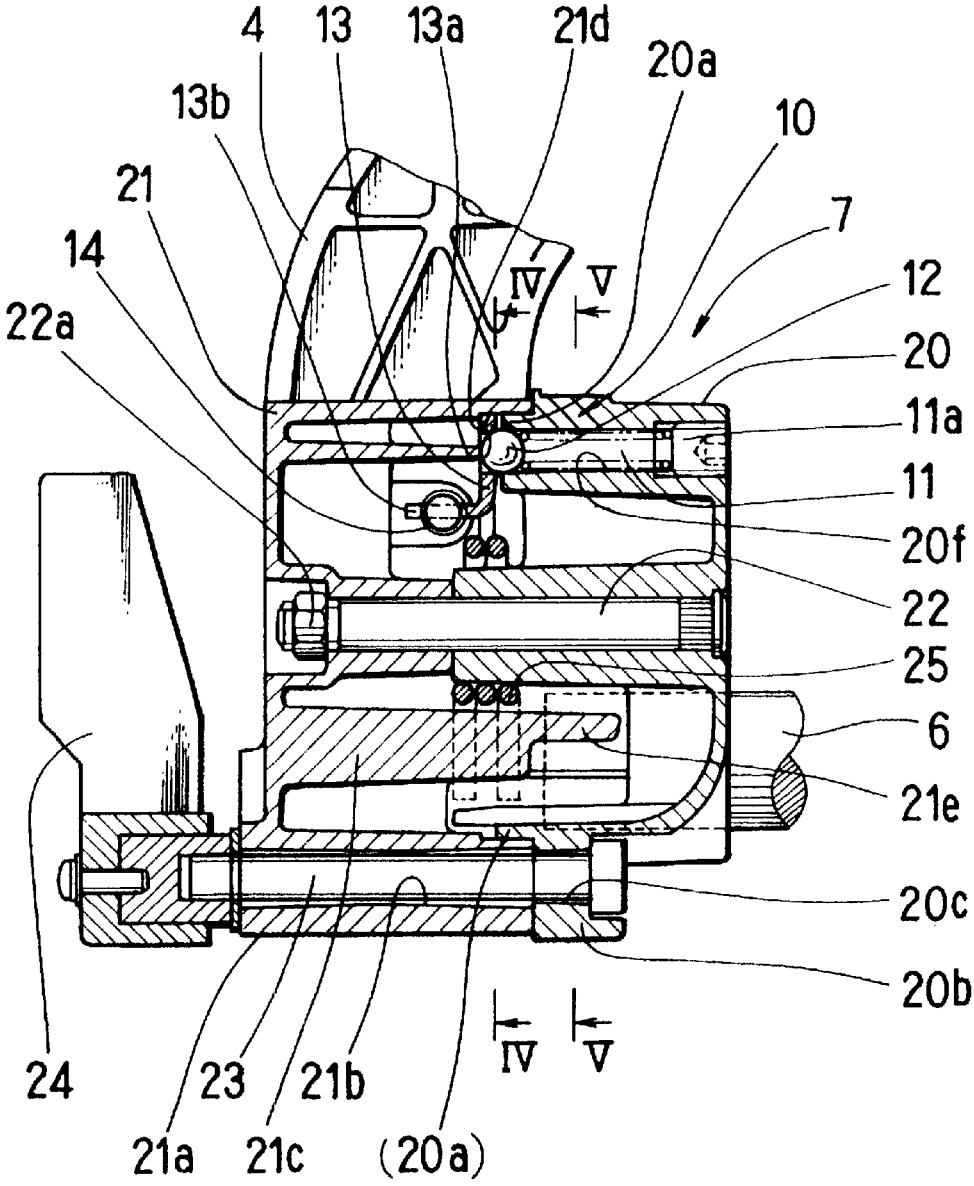
FIG. 3 is a vertical sectional view of a support mechanism of the miter saw.
Figure 5:
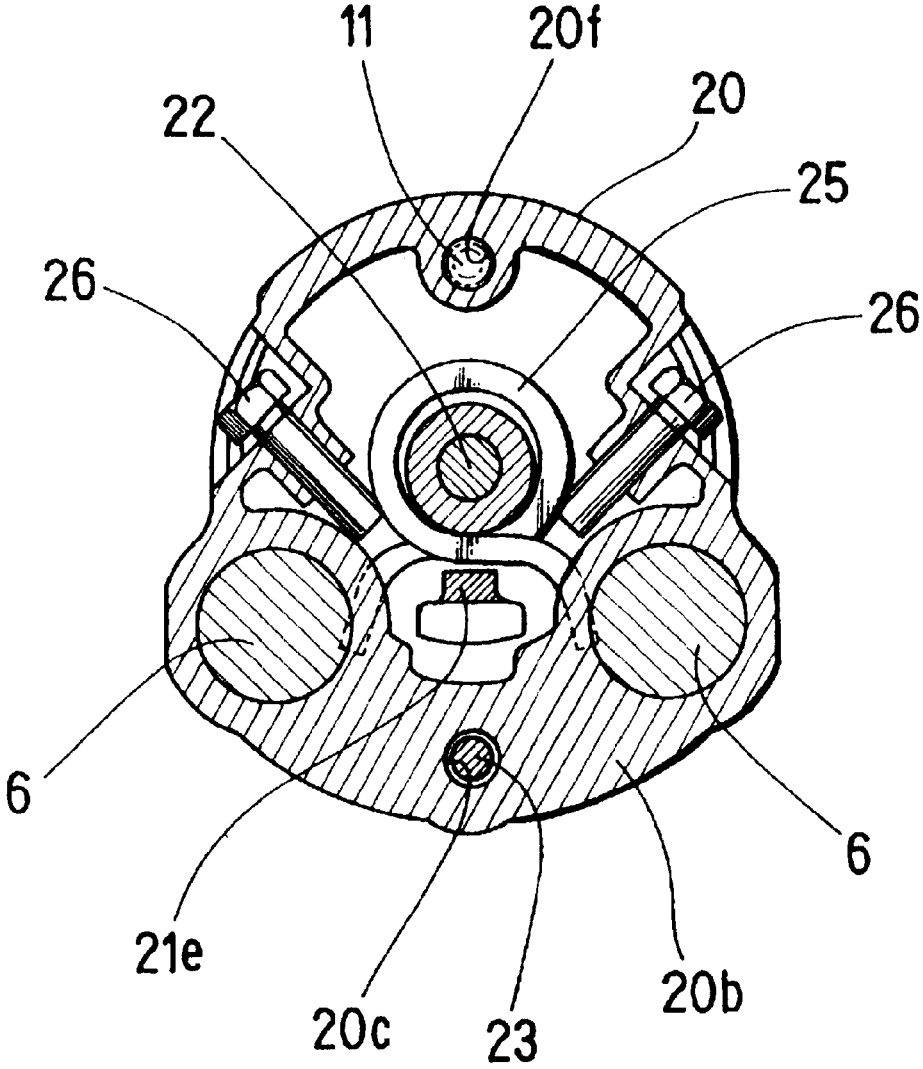
FIG. 5 is a sectional view taken along line V—V in FIG. 3.

The support arm 4 is supported on the turntable 3 by means of the support mechanism 7 including a pair of slide bars 6 (see FIGS. 3 and 5). The slide bars 6 are supported by the lower portion of the turntable 3 and are slidable relative to the turntable 3 in the forward and rearward direction (left and right directions as viewed in FIG. 1), so that the miter saw unit 5 as well as the support arm 4 is slidably movable relative to the turntable 3 within a predetermined range in the forward and rearward directions.

Figure 4:
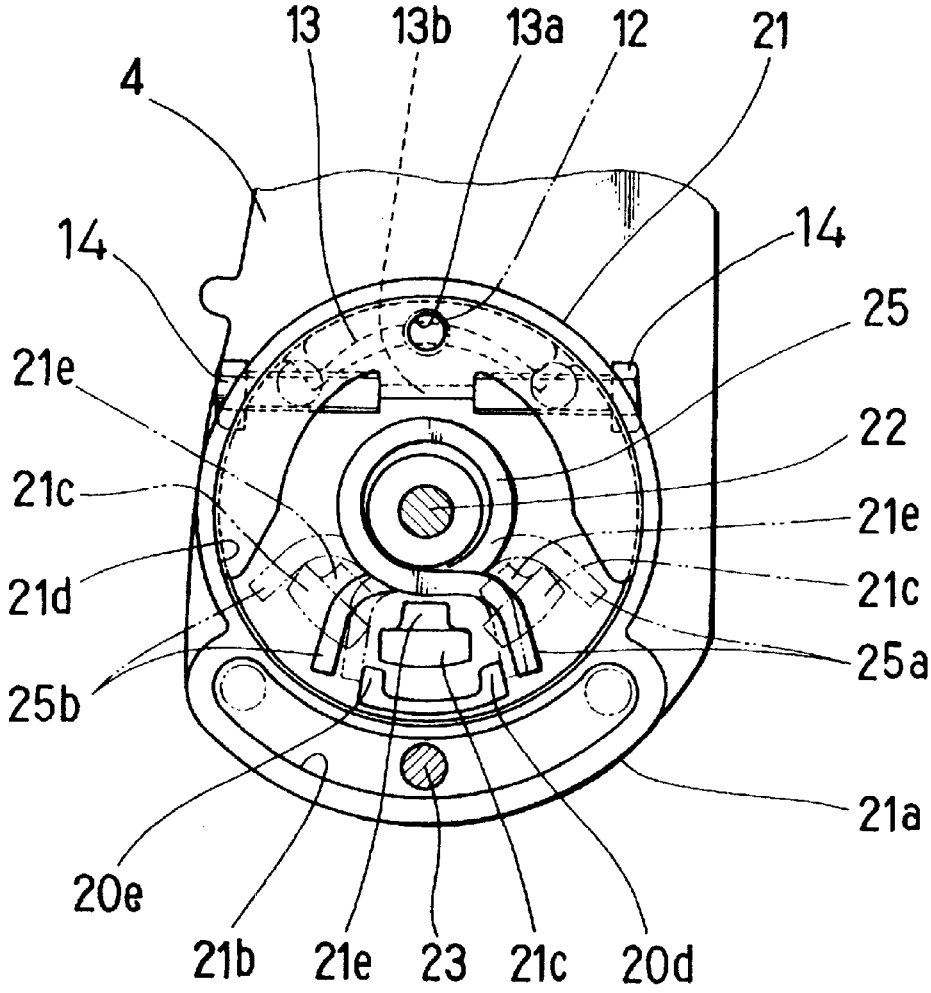
FIG. 4 is a sectional view taken along line IV—IV in FIG. 3.

The stopper mechanism 10 is assembled into the support mechanism 7. The construction of the support mechanism 7 is shown in FIGS. 3 to 5.

The support mechanism 7 includes a base side member 20, a saw unit side member 21, a support shaft 22 for pivotally connecting the saw unit side member 21 to the base side member 20, a lock screw 23 for fixing the position of the saw unit side member 21 relative to the base side member 20, and the stopper mechanism 10 described above.

The base side member 20 is fixedly mounted on rear ends of the slide bars 6 and has a substantially cylindrical configuration. The support shaft 22 is inserted into a central boss portion (not numbered) of the base side member 20.

The saw unit side member 21 also has a substantially cylindrical configuration and has an open front end which is slidably fitted on an annular flange portion 20a formed on an open rear end of the base side member 20, so that the saw unit side member 21 is rotatable relative to the base side member 20. The support shaft 22 is also inserted into a central boss portion (not numbered) of the saw unit side member 21. A nut 22a is threadably engaged with a rear end of the support shaft 22. When the nut 22a is tightened, the saw unit side member 21 is fixed in position relative to the base side member 20 in the axial direction of the support shaft 22 but is rotatable relative to the base side member 20.

As shown in FIG. 3, a stopper protrusion 21e is disposed within the saw unit side member 21 and is formed integrally therewith. On the other hand, as shown in FIG. 5, a pair of stopper bolts 26 are in engagement with the base side member 20 and are positioned such that their axes are directed toward both lateral sides of the stopper protrusion 21e. When the saw unit side member 21 is rotated relative to the base side member 20, the stopper protrusion 21e abuts on an inner end of any one of the stopper bolts 26, so that the saw unit side member 21 cannot be rotated further. The range of rotation of the saw unit side member 21 can be varied by adjusting the driving amount of the stopper bolts 26, so that the range of inclination of the saw blade 5c relative to its vertical position can be adjusted. The range of inclination is normally determined as about 45° on each of the right and left pivotal directions.

As shown in FIG. 5, an arcuate collar-like part 20b is formed integrally with the lower portion of the base side member 20 and extends circumferentially of the base side member 20. An insertion hole 20c for insertion of the lock screw 23 is formed in the collar-like part 20b and has an enlarged front end to form a seat for a head of the lock screw 23. As shown in FIGS. 3 and 4, a collar-like part 21a is formed integrally with the lower portion of the saw unit side member 21 and confronts the collar-like part 20b of the base side member 20. A slot 21b is formed in the collar-like part 21a and has a configuration elongated in a circumferential direction about the support shaft 22. The lock screw 23 extends from the insertion hole 20c into the slot 21b and has a rear end protruding outwardly from the rear surface of the collar-like part 21a. A lock lever 24 is threadably engaged with the rear end of the lock screw 23. Thus, the saw unit side member 21 is fixed in position in the rotational direction relative to the base side member 20 when the lock lever 24 is tightened or turned in one direction. The saw unit side member 21 is permitted to rotate relative to the base side member 20 when the lock lever 24 is loosened or turned in a reverse direction, so that the miter saw unit 5 is pivotable relative to the turntable 2 within a movable range of the lock screw 23 relative to the slot 21b.

As is best seen from FIG. 4, a coiled torsion spring 25 is fitted about the central boss portion of the base side member 20 which receives the support shaft 22. A pair of engaging protrusions 20d and 20e are formed integrally with the base side member 20 and are positioned within the base side member 20 below the support shaft 22. The engaging protrusions 20d and 20e are spaced from each other in the circumferential direction of the base side member 20. On the other hand, a hook protrusion 21c is formed integrally with the saw unit side member 21 and is positioned within the saw unit side member 21 below the support shaft 22. The engaging protrusions 20d and 20e as well as the hook protrusion 21c are positioned between both ends 25a and 25b of the torsion spring 25.

As the miter saw unit 5 is pivoted from the vertical position in the left side direction in FIG. 4, the saw unit side member 21 is rotated in the counterclockwise direction, so that the hook protrusion 21c abuts on one end 25a of the torsion spring 25 to rotate the torsion spring 25 in the same direction. When the saw unit side member 21 has been pivoted by a predetermined angle, the other end 25b of the torsion spring 25 abuts on the engaging protrusion 20e positioned on the left side, so that the other end [25a] *25b* cannot be moved further. As the result, the torsion spring 25 applies the biasing force to the saw unit side member 21 in the direction opposite to the rotational direction of the same (a direction in which the miter saw unit 5 is returned to the vertical position). The same operation is performed when the miter saw unit 5 is pivoted in the right side direction in FIG. 4. Thus, the biasing force of the torsion spring 25 is not applied to the saw unit side member 21 until the miter saw unit 5 is pivoted by the predetermined angle in the left side or right side direction. When the miter saw unit 5 is pivoted further, the torsion spring 25 applies the biasing force to the saw unit side member 21 opposite to the pivotal direction of the miter saw unit 5.

With this construction, when the lock screw 23 has been loosened, without support by hands of the operator, the miter saw unit 5 may not abruptly be pivoted by its gravity to its most pivoted position (the position where any of the stopper bolts 26 abuts on its corresponding stopper protrusion 21e) by virtue of the biasing force of the torsion spring 25. Therefore, the stopper bolts 26 and the stopper protrusions 21e as well as their associated parts may not be damaged. In addition, the operation for returning the miter saw unit 5 from the laterally pivoted position to the vertical position can be easily performed with the aid of the torsion spring 25, so that the operation for positioning the miter saw unit 5 to the vertical position can be easily performed. In FIG. 4, the torsion spring 25 and the hook protrusion 21c are indicated by solid lines when the miter saw unit 5 or the saw blade 5c is in the vertical position, and the torsion spring 25 and the hook protrusion 21c are indicated by chain lines when the miter saw unit 5 is in the right and left pivoted positions.

The vertical stopper mechanism 10 will now be explained. The vertical stopper mechanism 10 is disposed at the upper portion of the support mechanism 7 and mainly includes a ball 12 made of steel, a compression spring 11 for biasing the ball 12, a plate 13 having a recess 13a for partly receiving the ball 12, and a pair of adjusting screws 14 for adjusting the position of the plate 13.

A retainer hole 20f is formed in the upper portion of the base side member 20 and extends therethrough in parallel to the axis of the support shaft 22 or the pivotal axis of the miter saw unit 5. The ball 12 and the spring 11 are fitted into the retainer hole 20f. A stopper screw 11a is screwed into an enlarged front portion of the retainer hole 20f so as to close the front open end of the retainer hole 20f. In the mounting state, the ball 12 partly extends from the rear open end of the retainer hole 20f by the biasing force of the spring 11.

A stepped portion 21d is formed along the inner periphery of the front end of the saw unit side member 21 so as to form an annular recess having the same axis as the support shaft 22. The stepped portion 21d cooperates with the annular flange portion 20a of the base side member 20 to form a guide for the plate 13, so that the plate 13 is slidably movable in the circumferential direction along the stepped portion 21d. Here, the plate 13 has a curved outer periphery which corresponds to the configuration of the inner periphery of the stepped portion 21d.

Figure 6:
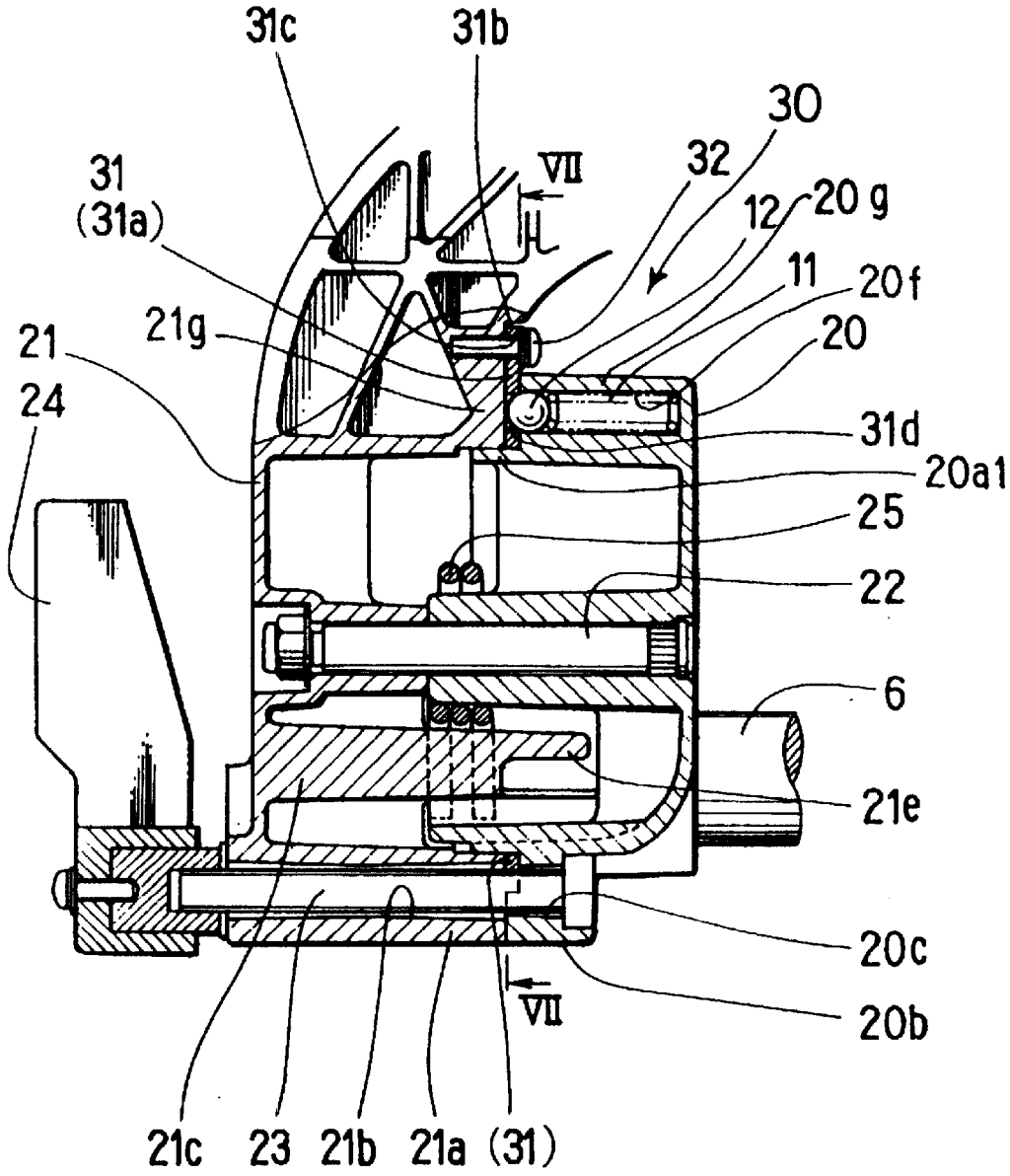
FIG. 6 is a sectional view of a support mechanism of a miter saw according to a second embodiment of the present invention.

As is best shown in FIG. 4, the plate 13 has a crescent-like configuration and extends circumferentially along the stepped portion 21d and has a circumferential length slightly longer than half the circumferential length of the stepped portion 21d, so that the plate 13 is rotatable along the stepped portion 21d but is not movable in the diametrical direction of the base side member 20. If the plate 13 is designed to have a circumferential length shorter than half the circumferential length of the stepped portion 21d, it is required to incorporate a special measure for preventing the plate 13 from moving in the diametrical direction. For example, the plate 13 may be rotatably supported by the central boss portion of the saw unit side member 21 which receives the support shaft 22. Otherwise, the plate 13 may have a complete annular configuration. The plate 13 is incorporated for permitting adjustment of the position of the recess 13a by a suitable range, and therefore, the plate 13 may have a smaller size as long as the recess 13a can be formed in the plate 13. However, if the plate 13 has such a smaller size, a special support structure must be incorporated as described above. This may result in complicated construction of the miter saw. An embodiment incorporating a complete annular plate is shown in FIG. 6 and will be explained later.

In the first embodiment, the recess 13a is a through hole formed in the plate 13 and is positioned substantially centrally in the circumferential direction of the plate 13. The recess 13a has a diameter slightly smaller than the diameter of the ball 12. The plate 13 has an extension 13b which extends rearwardly from the inner side of the plate 13 and which is positioned radially inwardly of the recess 13a. The extension 13b has both lateral sides on which the adjusting screws 14 are brought to abut.

The adjusting screws 14 are screwed into the saw unit side member 21 from the outside of the saw unit side member 21, so that the adjusting screws 14 have inner ends protruding into the saw unit side member 21. The rotational position of the plate 13 can be precisely adjusted by adjusting the driving amount of each of the adjusting screws 14 from the outside, so that the vertical position of the miter saw unit 5 or the vertical position of the saw blade 5c can be easily adjusted from the outside.

With the stopper mechanism 10 described above, when the miter saw unit 5 or the saw blade 5c is not in the vertical position, the ball 12 is held in abutment on a surface of the plate 13 but is not in engagement with the recess 13a. When the miter saw unit is moved by the operator from the pivoted position to the vertical position, the recess 13a is brought to confront the ball 12, so that the ball 12 is automatically engaged with the recess 13a by the biasing force of the spring 11. This engaging state is maintained by the biasing force of the spring 11. The operator can therefore feel the engaging movement of the ball 12 by his hand, so that the operator can recognize the vertical position of the miter saw unit 5. Since the engaging state is maintained by the biasing force of the spring 11, the operator is not required to hold the miter saw unit 4 in the vertical position. With the miter saw unit 5 thus held in the vertical position, the operator turns the lock lever 24 in one direction so as to fix the saw unit side member 21 in position relative to the base side member 20, so that the miter saw unit 5 can be fixed in the vertical position.

Here, the position of the ball 12 relative to the recess 13a when engaged is always determined at one point by the centripetal function of the ball 12. Therefore, the vertical position of the miter saw unit 5 can be accurately determined.

In order to laterally pivot the miter saw unit 5 from the vertical position, the operator turns the lock lever 24 in the reverse direction so as to release the saw unit member 21 from the base side member 20. Then, the operator forces the miter saw unit 5 in the desired direction to be pivoted, so that the ball 12 is removed from the recess 13a against the biasing force of the spring 11 so as to permit pivotal movement of the miter saw unit 5. When the miter saw unit 5 has been pivoted to the desired pivotal position, the operator turns the lock lever 24 so as to fix the saw unit side member 21 in position relative to the base side member 20.

Thus, with this embodiment, the miter saw unit 5 can be pivoted from the vertical position by applying the force to the miter saw unit 5 in the desired pivotal direction without any troublesome operations such as an operation for removing a stopper pin as required in the conventional miter saw. In addition, the vertical position of the miter saw unit can be automatically determined through engagement of the ball 12 with the recess 13a, and the miter saw unit 5 can be held in the vertical position, when the miter saw unit 5 is moved from the pivotal position to the vertical position. Therefore, the operator can easily position the miter saw unit 5 to the vertical position.

Further, since the vertical position can be determined through engagement of the ball 12 with the recess 13a, the ball 12 can be removed from the recess 13a by applying the force in any of the right and left pivotal directions, so that the miter saw unit 5 can be easily pivoted from the vertical position in any of the right and left pivotal directions.

As described previously in the description of the prior art, with the conventional miter saw utilizing a stopper pin or a stopper holder as a vertical stopper, it is not necessary to operate the stopper pin as long as the miter saw is operated with the miter saw unit positioned in the vertical position or a left side pivotal range (normal operational range). However, when the miter saw unit is required to be moved from the left pivoted position to the right side pivotal range via the vertical position, the operator must pull the stopper pin or must move the stopper holder to the retracted position.

In contrast, with the miter saw of the first embodiment, since the ball 12 can be removed from the recess 13a by applying the force in any of the right and left pivotal directions, the operator requires no special operation as required in the conventional miter saw for pivoting the miter saw unit 5 from the pivoted position in the left side pivotal range to the pivoted position in the right side pivotal range via the vertical position or vice versa, or for pivoting the miter saw unit 5 from the vertical position to the right side pivotal range.

A second and a third embodiment of the present invention will now be described. These embodiments are modifications of the first embodiment. Therefore, like members are given the same reference numerals and their description will not be repeated.

Figure 7:
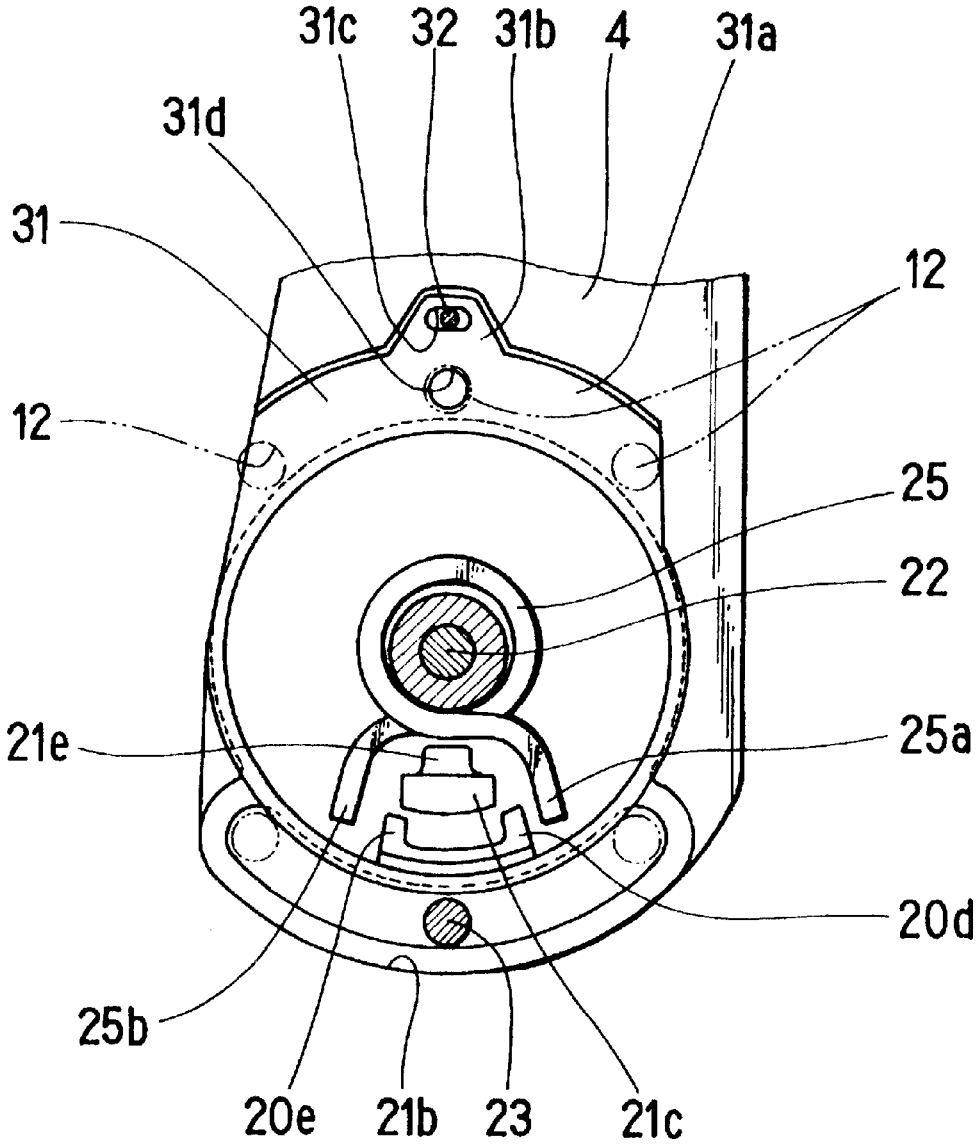
FIG. 7 is a sectional view taken along line VII—VII in FIG. 6.

The second embodiment will be explained with reference to FIGS. 6 and 7. This embodiment includes a stopper mechanism 30 which is different from the stopper mechanism 10 of the first embodiment in the configuration of a plate 31 corresponding to the plate 13 and a support structure of the plate 31 and in the provision of no stopper bolts 14.

The plate 31 of this embodiment has a complete annular configuration and has the same axis as the support shaft 22 or the pivotal axis of the miter saw unit 5. As is best shown in FIG. 7, an upper portion 31a of the plate 31 in a range of about 90° has a width in the diametrical direction of the plate 31 greater than the width of the other portion. A recess 31d for engagement with the ball 12 is formed in substantially the central position of the upper portion 31a. An extension 31b extends radially outwardly from the upper portion 31a and has an elongated slot 31c formed therein. The elongated slot 31c has an arcuate configuration about the axis of the support shaft 22.

The plate 31 is slidably fitted on an annular flange portion 20a1 formed on the rear end of the base side member 20. The annular flange portion 20a1 is slidably inserted into the front open end of the saw unit side member 21. In this embodiment, the retainer hole 20f is formed on an upper part 20g of the base side member 20 positioned outwardly of the annular flange portion 20a1, so that the plate 31 is circumferentially slidably held between the upper part 20g and a part 21g of the saw unit side member 21 confronting the upper part 20g. The part 21g constitutes a base portion of the support arm 4. A fixing screw 32 is screwed into the part 21g through the elongated slot 31c of the plate 31, so that the plate 31 can be fixed in position relative to the saw unit side member 21. By loosening the fixing screw 32, the position of the plate 31 relative to the saw unit side member 21 can be adjusted within a range of the length of the elongated hole 31c, so that the vertical position of the miter saw unit 5 or the saw blade 5c can be easily performed from the outside.

The engaging operation of the ball 12 with the recess 31d by the biasing force of the spring 11 performed when the miter saw unit 5 is brought to the vertical position is the same as the first embodiment, so that the second embodiment has the same effects as the first embodiment.

Figure 8:
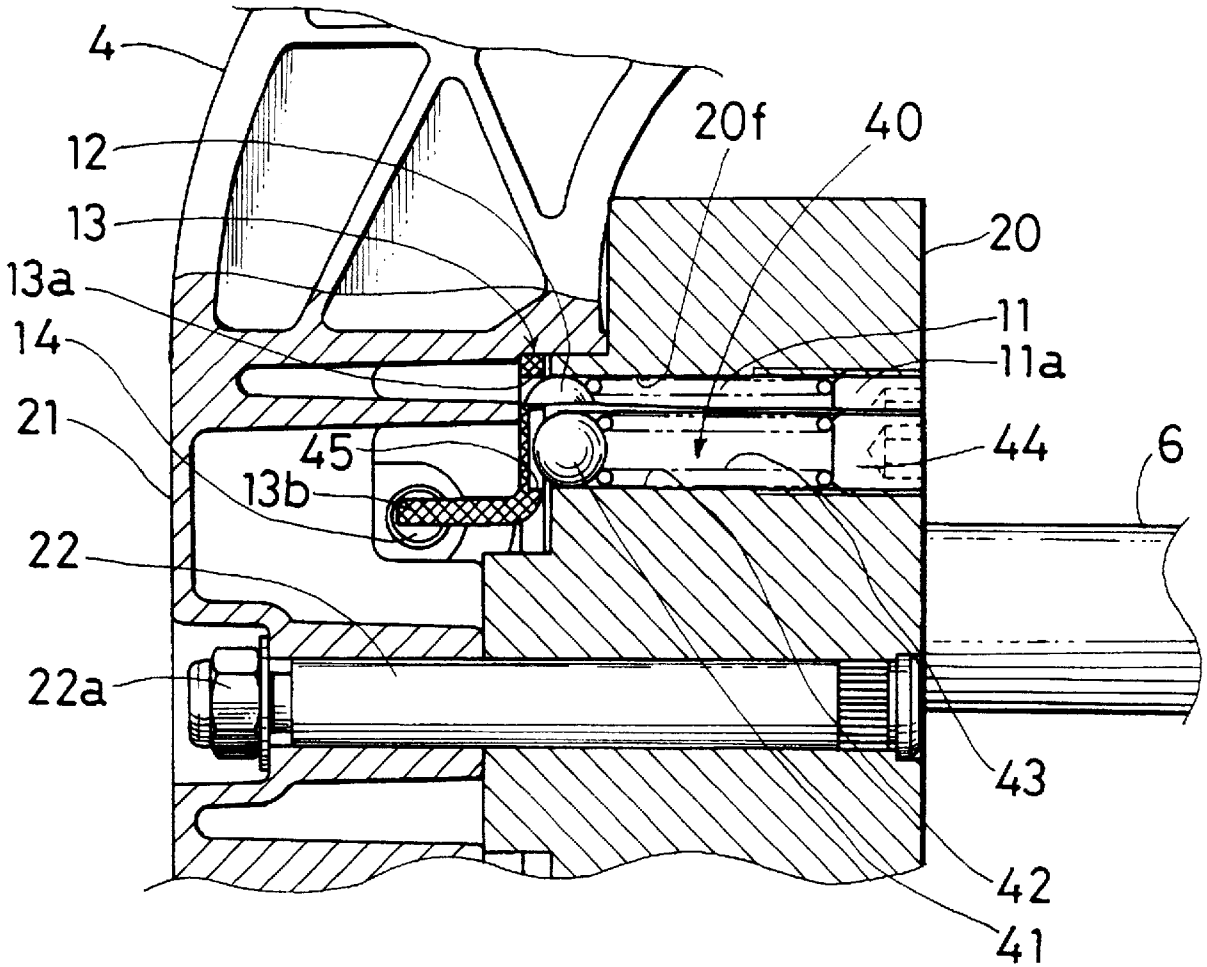
FIG. 8 is a sectional view of a support mechanism of a miter saw according to a third embodiment of the present invention.

The third embodiment will now be explained with reference to FIGS. 8 to 10. This embodiment is characterized in the provision of a stopper assist mechanism 40 for the stopper mechanism 7. The stopper assist mechanism 40 mainly includes a ball 41 made of steel and a recess 45.

Figure 9:
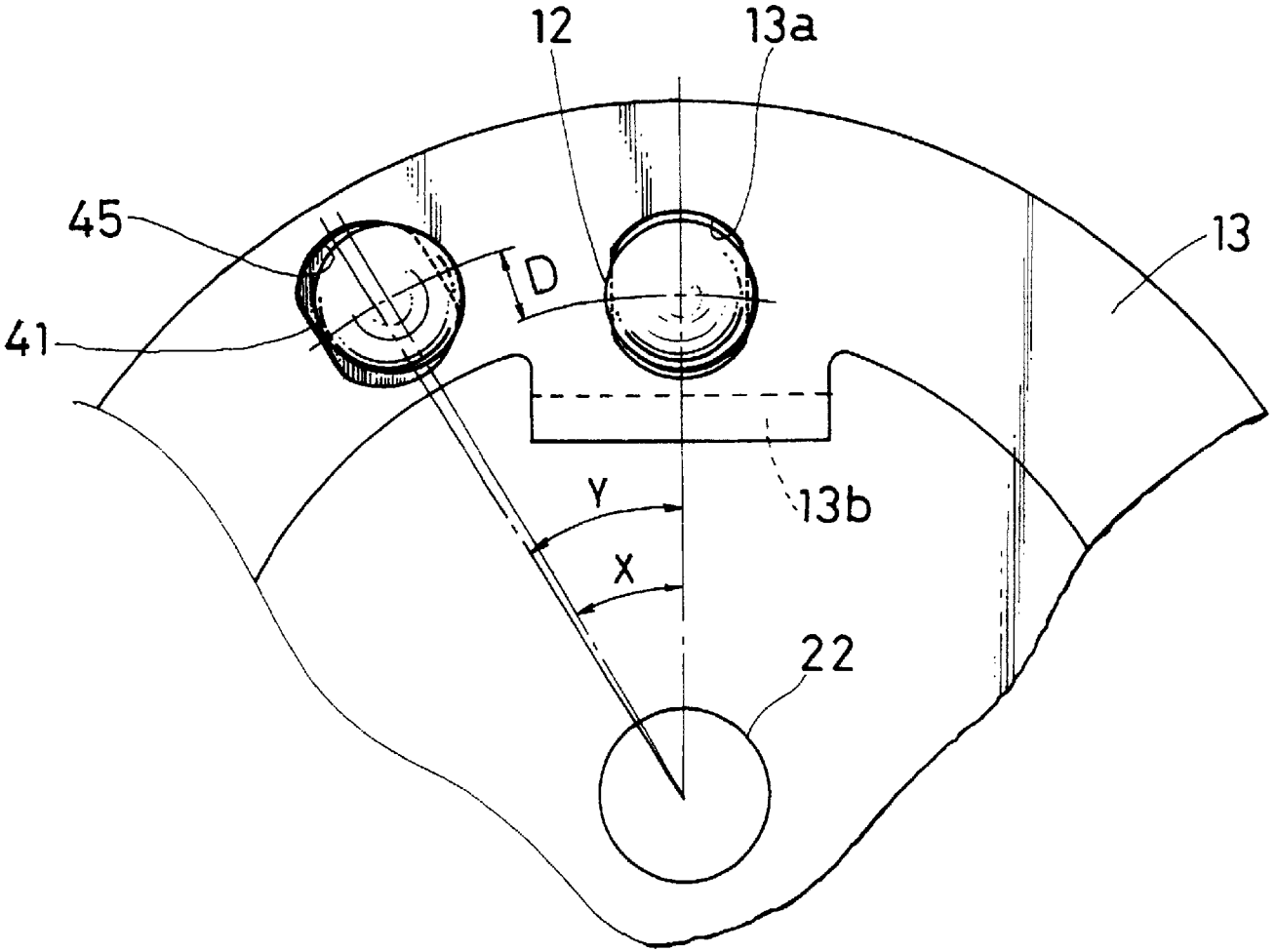
FIG. 9 is a front view of an upper part of a plate and showing the positional relationship between balls and recesses of a stopper mechanism of the miter saw of the third embodiment.
Figure 10A:
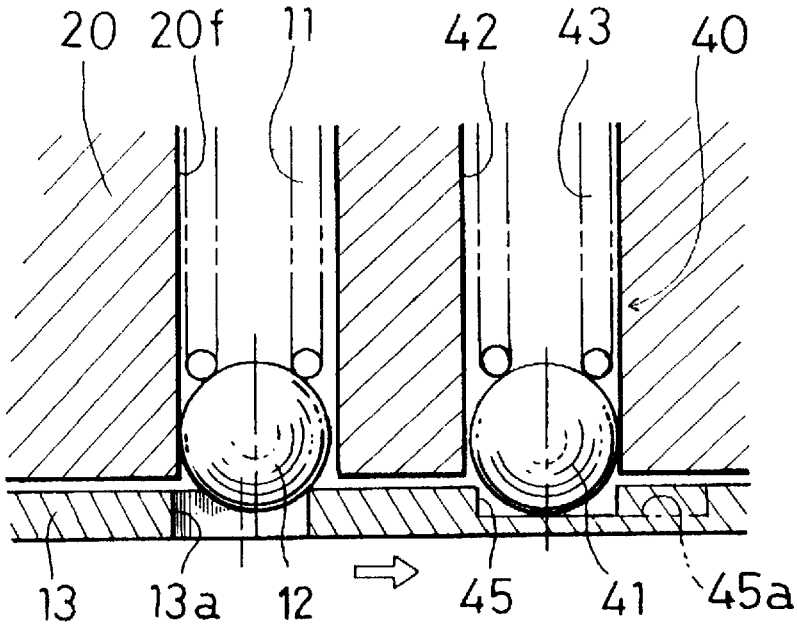
FIG. 10(A) is an explanatory sectional view showing the positional relationship between the balls and the recesses immediately before the miter saw unit reaches the vertical position.
Figure 10B:
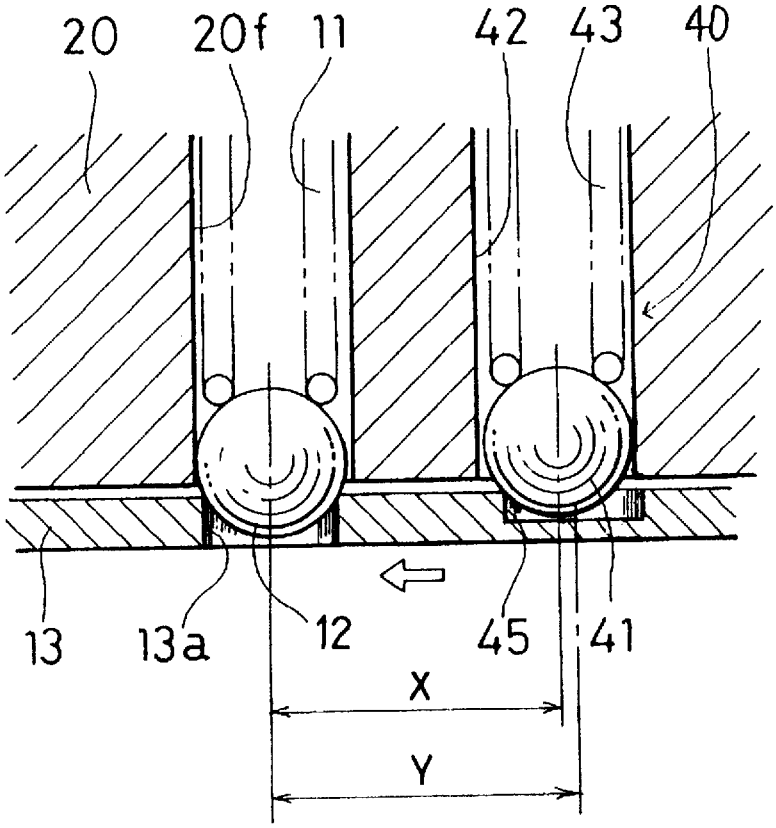
FIG. 10(B) is a view similar to FIG. 10(A) but showing the state where the miter saw unit is in the vertical position.

As best shown in FIGS. 9, 10(A) and 10(B), a retainer hole 42 is formed in the [saw] *base* unit side member 20 in a position spaced from the retainer hole 20f by an angle of X about the axis of the support shaft 22 in the direction toward the normal pivotal area (left side as viewed in FIG. 9). The retainer hole 42 having the same diameter as the retainer hole 20f extends in parallel to the retainer hole 20f, and the ball 41 having the same diameter as the ball 12 is received within the retainer hole 42 together with a compression spring 43 for biasing the ball 41, so that the ball 41 partly extends from the rear opening of the retainer hole 42 in the same direction as the ball 12. A stopper screw 44 is screwed into the front opening of the retainer hole 42 so as to close the front opening and to support the front end of the spring 43.

The recess 45 for engagement with the ball 41 is formed in the plate 13 and has the same diameter as the recess 13a. As shown in FIG. 9, the recess 45 is spaced from the recess 13a by an angle of Y which is slightly greater than the angle of X between the retainer holes 20f and 42.

As shown in FIGS. 10(A) and 10(B), the recess 45 is different from the recess 13a in that the recess 45 has a closed bottom (not numbered), so that the ball 41 may not simultaneously contact both front and rear edge parts of the recess 45 in the pivotal direction when the ball 41 is in abutment on the bottom of the recess 45 as shown in FIG. 10(A). In contrast, the ball 12 is engageable with the recess 13a with the ball 41 abutting on the entire edge including both front and rear edge parts of the recess 13a in the pivotal direction since the recess 13a extends throughout the plate 13.

In addition, in this embodiment, the recess 13a is positioned slightly radially inwardly from the position of the same in the first embodiment. Further, the recess 13a of this embodiment is elongated in the radial direction of the plate 13. On the other hand, the recess 45 is displaced radially outwardly from the recess 13a by a distance of D, so that the ball 12 may not engage the recess 45 or the ball 41 may not engage the recess 13a when the miter saw unit 5 is pivoted or when the saw unit side member 21 is rotated relative to the base side member 20. Because of such displacement between the recesses 13a and 45 in the radial direction, the retainer holes 20f and 42 as well as the balls 12 and 41 are displaced from each other by the same distance of D in the radial direction.

As with the recess 13a, the recess 45 is elongated in the radial direction of the plate 13, so that the inner and outer edge parts of the recess 45 as well as the inner and outer edge parts of the recess 13a serve as relief parts on which the ball 41 as well as the ball 12 may not abut. Thus, when the miter saw unit 5 is in the vertical position, the ball 12 engages the recess 13a with the ball 12 abutting only on the front and rear edge parts of the recess 13a, and the ball 41 engages the recess 45 with the ball 41 abutting only on the front edge part of the recess 45. The balls 12 and 41 are therefore held in position relative to the plate 13.

With the stopper mechanism 40 thus constructed, when the miter saw unit 5 is pivoted from the right side pivoted position (not normally used) toward the vertical position, the plate 13 is moved in the right direction in FIG. 10(A) (indicated by an arrow in FIG. 10(A)), the ball 41 is brought to engage the recess 45 and to abut on the bottom thereof immediately before the ball 12 is brought to engage the recess 13a (see FIG. 10(A)).

In this state, the ball 12 is not completely engaged with the recess 13a, so that the spring 11 applies the biasing force to the plate 13 in the right direction (the direction of arrow) by means of the ball 12. Since the ball 41 is in abutment on the bottom of the recess 45 in this state, the force of the spring 43 does not serve to move (rotate) the plate 13. Thus, the plate 13 in the state shown in FIG. 10(A) may not be held in position relative to the base side member 20 but is forced to rotate in the right direction as viewed in FIG. 10(A), so that the ball 12 is consequently brought to completely engage the recess 13a as shown in FIG. 10(B).

As the ball 12 is brought to completely engage the recess 13a, the ball 41 is moved from the position in abutment on the bottom of the recess 45 to ride onto the front edge part of the recess 45. Since the ball 41 is biased by the spring 43 to extend toward the plate 13, the spring 43 applies a force to move (rotate) the plate 13 in the left direction as viewed in FIG. 10(B) indicated by an arrow in this figure by means of the ball 41. Such a force produced by the spring 43 may push, together with the plate 13, the ball 12 which is completely engaged with the recess 13a, so that the ball 12 is pressed on the left side part of the inner surface of the retainer hole 20f. The vertical position of the miter saw unit 5 is thus determined.

As described above, in the vertical position of the miter saw unit 5, the ball 12 is pressed on the inner surface of the retainer hole 20f by means of the stopper assist mechanism 40. Therefore, even if a gap exists between the ball 12 and the inner surface of the retainer hole 20f due to the difference in machining accuracy between the ball 12 and the retainer hole 20f or some other reason, the vertical position can be accurately determined.

The third embodiment may be modified in various manners.

For example, since the rear edge part of the recess 45 does not assist in producing the force to move the plate 13, a cut-out portion 45a serves as a relief portion may be formed on the rear edge part of the recess 45 as indicated by chain lines in FIG. 10(A).

In addition, the recess 45 may be formed as a through hole having a diameter to permit the ball 41 to pass through that through hole. In this case, a rib (not shown) which may be a part of the saw unit side member 21 may be positioned on one side of the recess 45 opposite to the retainer hole 42 for preventing the ball 41 from being removed from the recess 45.

Further, although in the third embodiment, the angle Y between the recesses 13a and 45 is greater than the angle X between the balls 12 and 41, the angle Y may be smaller than the angle X. In such a case, in the vertical position of the miter saw unit 5, the ball 41 is ridden onto the rear edge part of the recess 45 so as to produce a force to move (rotate) the plate 13 in the right direction in FIG. 10(B), so that the ball 12 is pressed on the right side part of the inner surface of the retainer hole 20f. In this case, the cut-out portion 45a may be formed on the left side of the recess 45.

Thus, the provision of the difference between the angles X and Y is a requirement for utilizing the biasing force of the spring 43 to press the ball 12 on the inner surface of the retainer hole 20f.

Meanwhile, as described in connection with the first embodiment, the motor 5b is positioned on the right side of the miter saw unit 5 or is positioned on the left side of the recess 13a in FIGS. 10(A) and 10(B). Thus, with the arrangement shown in FIGS. 10(A) and 10(B), the direction of the force applied by the stopper assist mechanism 40 to the ball 12 is the same as the direction of the force applied by the gravity of the motor 5b to the plate 13. Therefore, the arrangement shown in FIGS. 10(A) and 10(B) is preferable since the force applied by the stopper assist mechanism 40 may not be reduced by the force produced by the gravity of the motor 5b.

Figure 11A:
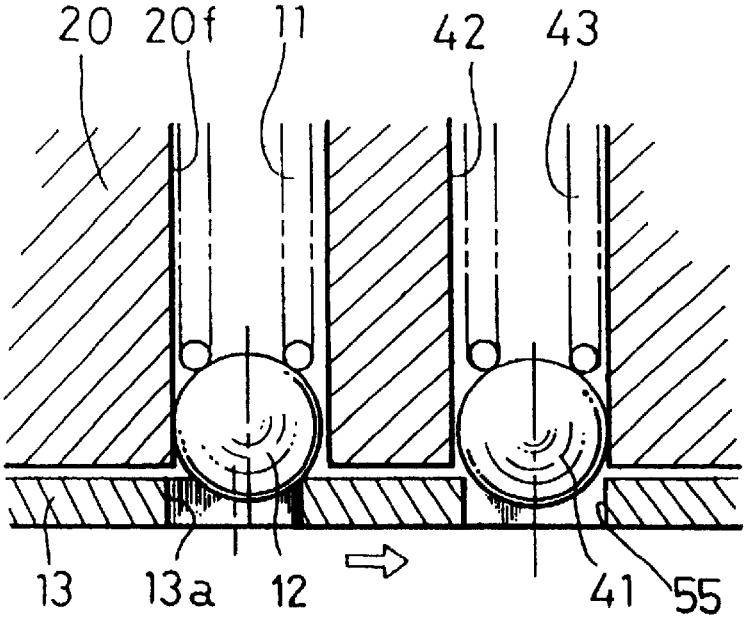
FIGS. 11(A) and 11(B) are view similar to FIGS. 10(A) and 10(B), respectively, but showing a modification of the third embodiment.
Figure 11B:
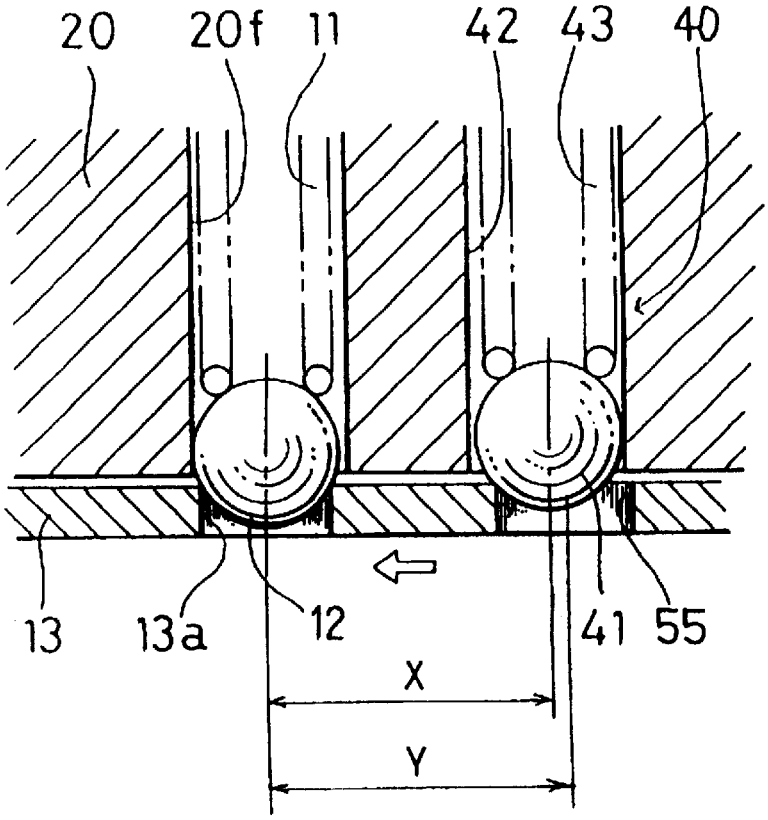

A further modification is shown in FIGS. 11(A) and 11(B). In this modification, the recess 45 is replaced by a through hole 55 which has a diameter smaller than the diameter of the recess 13a. In addition, the force of the spring 43 is determined to be smaller than the force of the spring 11.

With this modification, when the miter saw unit 5 is pivoted from the right side pivoted position (not normally used) toward the vertical position, the plate 13 is moved in the right direction as viewed in FIG. 11(A) (indicated by an arrow in FIG. 11(A)), the steel ball 41 is brought to engage the recess 55 immediately before the ball 12 is brought to engage the recess 13a (see FIG. 11(A)).

In this state, the ball 12 is not completely engaged with the recess 13a, so that the spring 11 applies the biasing force to the plate 13 in the right direction (the direction of arrow) by means of the ball 12. Since the ball 41 is in engagement with the recess 55 in this state, the force of the spring 43 does not serve to move (rotate) the plate 13. Since the diameter of the recess 55 is smaller than the recess 13a and the force of the spring 43 is smaller than the spring 11, the ball 41 is removed from the recess 55 by the force of the spring 11 applied to the plate 13 via the ball 12, so that the ball 12 is consequently brought to completely engage the recess 13a as shown in FIG. 11(B).

As the ball 12 is brought to completely engage the recess 13a, the ball 41 is moved to ride onto the front edge part of the recess 45. Since the ball 41 is biased by the spring 43 to extend toward the plate 13, the spring 43 applies a force to move (rotate) the plate 13 in the left direction as viewed in FIG. 11(B) indicated by an arrow in this figure by means of the ball 41. As the result, the ball 12 is pressed on the left side part of the inner surface of the retainer hole 20f, so that the vertical position of the miter saw unit 5 is determined in the same manner as described in connection with FIGS. 10(A) and 10(B).

Although in the first to second embodiments, the balls 12 and 41 are utilized as pressing members, they may be replaced by pins having hemispherical ends.

In addition, the same construction can be adapted to a miter saw which does not include the slide shafts 6, and to a miter saw which is fixedly placed on a work place. Further, the same construction can be adapted to a miter saw having slide shafts positioned between a support arm and a miter saw unit.

While the invention has been described with reference to preferred embodiments thereof, it is to be understood that modifications or variations may be easily made without departing from the spirit of this invention which is defined by the appended claims.

What is claimed is:

1. In a miter saw comprising a miter saw base for placing a work thereon, a miter saw unit having a saw blade mounted thereon, and a support mechanism for supporting the miter saw unit for both rightward and leftward pivotal movement in pivotal directions from and to a vertical position relative to the base, the support mechanism including a first side member on one of the base and the miter saw unit and a second side member on the other of the base and the miter saw unit, the first side member and the second side member being pivotable relative to each other about a pivotal axis, said first side member being fixed to said one of the base and the miter saw unit for precluding movement therebetween about said pivotal axis, said second side member being fixed to said other of the base and the miter saw unit for precluding movement therebetween about said pivotal axis, the improvement comprising:

a stopper mechanism disposed between the first side member and the second side member for *releasably* holding the miter saw unit in a vertical position;

said stopper mechanism including:

a first pressing member mounted on and extendible relative to the first side member toward said second side member, *the first pressing member comprising a semispherical surface*;

first biasing means for resiliently biasing said first pressing member toward said second side member; and

[an] *a plate defining a substantially vertically oriented* abutting surface [provided] *adjustably disposed* on said second side member [with], *wherein* said *semispherical surface of the* first pressing member *is* resiliently biased [thereagainst], *against the plate, the position of said plate is adjustable in the circumferential direction about the pivotal axis and a first recess is formed within* said abutting surface [having a first recess formed therein];

said *semispherical surface of the* first pressing member automatically engaging in and being retained in said first recess by a biasing force of said first biasing means upon positioning of said miter saw unit in the vertical position relative to said base, wherein the engagement of said first pressing member in said first recess indicates the vertical positioning of said miter saw unit *and said semispherical surface of the first pressing member automatically disengages from said first recess upon application of a lateral force to the miter saw unit or the support mechanism and wherein each of the first and second side members has a substantially cylindrical configuration.*

2. The miter saw as defined in claim 1 wherein said first pressing member is biased by said first biasing means in a direction parallel to the pivotal axis of the miter saw unit.

3. The miter saw as defined in claim 2 wherein said first pressing member comprises a first ball, and wherein said first recess has a substantially circular configuration with a peripheral edge, so that said first ball is in engagement with said first recess with said first ball being pressed onto the peripheral edge of said first recess when the miter saw unit is in the vertical position.

[4. The miter saw as defined in claim 1 wherein said abutting surface having said first recess is formed on a plate mounted on the second side member, and wherein the position of said plate relative to the second side member is adjustable.]

5. The miter saw as defined in claim [4] *1* wherein each of the first and second side members has a substantially cylindrical configuration[, and wherein the position of said plate is adjustable in a the circumferential direction about the pivotal axis of the miter saw unit].

6. The miter saw as defined in claim [5] *1* wherein said second side member has an inner periphery with a circumferential length, said plate being slidably movable along the inner periphery of the second side member, and wherein said plate has a circumferential length greater than half the circumferential length of the inner periphery of the second side member.

7. The miter saw as defined in claim [5] *1* further including adjusting means operable from outside of the miter saw for adjusting the position of said plate.

8. The miter saw as defined in claim 7 wherein said adjusting means includes a stopper portion formed on said plate and a pair of bolts threadably engaged with the second side member and disposed on both sides of said stopper portion, each of said bolts having a head positioned outside of the second side member and a shank end positioned within the second side member, so that said stopper portion of said plate is fixed between said shank ends of said bolts.

9. The miter saw as defined in claim [5] *1* wherein said plate has an annular configuration and is disposed between confronting ends of the first side member and the second side member, wherein said plate has an outer peripheral part extending outwardly from the first side member, and wherein said outer peripheral part is secured to the second side member by means of a screw which is inserted into said outer peripheral part through a slot formed in said outer peripheral part and elongated in the circumferential direction, so that the position of said plate is adjustable within the length of said slot.

10. The miter saw as defined in claim 2 and further including a stopper assist means for pressing the first side member and the second side member relative to each other in the pivotal direction of the miter saw unit when the miter saw unit is in the vertical position with said first pressing member being in engagement with said first recess by the biasing force of said first biasing means.

11. The miter saw as defined in claim 10 wherein said miter saw unit includes a motor positioned on one lateral side in the pivotal directions of the miter saw unit when the miter saw unit is in the vertical position, wherein the first side member is fixed on the base, and the second side member is fixed on the miter saw unit, and wherein said stopper assist mechanism is operable to force the second side member in a direction toward the pivotal direction on the same lateral side as said motor.

12. The miter saw as defined in claim 10 wherein said stopper assist means includes a second pressing member and second resilient biasing means mounted on the first side member, and includes a second recess formed in said abutting surface [provided] *defined* on the [second side member] *plate*, said second pressing member being engageable with said second recess, and said second pressing member riding onto a peripheral edge part of said second recess on one side in the pivotal directions when the miter saw unit is in the vertical position, so that said second pressing member biased by said second resilient biasing means applies a pressing force to the first side member in one of the pivotal directions of the miter saw unit.

13. The miter saw as defined in claim 12 wherein said first recess and said second recess are formed in said abutting surface at different positions from each other in a radial direction about the pivotal axis, and wherein said first pressing member and said second pressing member are mounted on the second side member at different positions from each other in the radial direction.

14. In a miter saw comprising a miter saw base for placing a work thereon, a miter saw unit having a saw blade mounted thereon, and a support mechanism for supporting the miter saw unit for both rightward and leftward pivotal movement in pivotal directions from and to a vertical position relative to the base, the support mechanism including a first member on one side of the base and the miter saw unit and a second member on the other side of the base and the miter saw unit, and the first member and the second member being pivotable relative to each other about a pivotal axis, the improvement comprising:

a stopper mechanism disposed between the first member and the second member for holding the miter saw unit in a vertical position;

said stopper mechanism including:

a first pressing member mounted on the first member;

first biasing means for biasing said first pressing member; and an abutting surface provided on said second member for abutment of said first pressing member, said abutting surface having a first recess formed therein;

said first pressing member being brought to automatically engage said first recess by a biasing force of said first biasing means when the miter saw unit is pivoted from a laterally pivoted position to the vertical position, said first pressing member being biased by said first biasing means toward the second member in a direction parallel to the pivotal axis of the miter saw unit, a stopper assist means for pressing the first member and the second member relative to each other in the pivotal direction of the miter saw unit when the miter saw unit is in the vertical position with said first pressing member being in engagement with said first recess by the biasing force of said first biasing means, said stopper assist means including a second pressing member and second biasing means mounted on the first member, and including a second recess formed in said abutting surface provided on the second member, said second pressing member being engageable with said second recess, and said second pressing member riding onto a peripheral edge part of said second recess on one side in the pivotal directions when the miter saw unit is in the vertical position, so that said second pressing member biased by said second biasing means applies a pressing force to the first member in one of the pivotal directions of the miter saw unit, said first pressing member comprising a first ball;

said second pressing member comprises a second ball;

each of said first and second recesses has a substantially circular configuration, so that said first and second balls are partly received by said first and second recesses, respectively; and when the miter saw unit in the vertical position, said first ball engages said first recess with said first ball abutting on opposed peripheral edge parts in the pivotal directions of the miter saw unit, and said second ball is engaged with and partially on said peripheral edge part of said second recess.

15. The miter saw as defined in claim 14 wherein the center of said first ball and the center of said second ball are angularly displaced by an angle X about the pivotal axis of the miter saw unit, and the center of said first recess and the center of said second recess are angularly displaced by an angle Y which is different from said angle X.

16. The miter saw as defined in claim 14 wherein said second recess has a bottom on which said second ball abuts when said second ball is in engagement with said second recess.

17. The miter saw as defined in claim 14 wherein said first ball and said second ball have the same diameter, wherein said first recess and said second recesses are through holes, wherein the diameter of said second recess is smaller than the diameter of said first recess, and wherein the biasing force of said second biasing means is smaller than the biasing force of said first biasing means.

*18. A miter saw comprising:*

*a base adapted to support a workpiece,*

*a saw unit comprising a saw blade,*

*a base side member connected to the base,*

*a saw unit side member connected to the saw unit, wherein the saw unit side member is arranged and constructed to pivot relative to the base side member about a pivotal axis,*

*a first one of the base side member and the saw unit side member comprising a first substantially horizontally oriented retainer hole, a second horizontally oriented retainer hole, a first compression spring disposed within the first retainer hole and a second compression spring disposed within the second retainer hole, the first retainer hole being spaced from the second retainer hole by an angle X about the pivotal axis, and*

*a second one of the base side member and the saw unit side member comprising a first recess having a first diameter and a second recess spaced from the first recess by angle Y about the pivotal axis, wherein X is different from Y, and alignment of the first recess and the first retainer hole represents a vertical position, or a substantially vertical position, of the saw unit relative to the base,*

*a first pressing member selected from the group consisting of a ball and a hemispherical pin and being at least partially disposed within the first retainer hole and biased in the horizontal direction by the first compression spring toward the first recess, the first pressing member having a second diameter, wherein the second diameter is greater than the first diameter so that the first pressing member only partially engages the recess when the saw unit is positioned vertically, or substantially vertically, relative to the base and*

*a second pressing member selected from the group consisting of a ball and a hemispherical pin and being at*

*least partially disposed within the second retainer hole, the second compression spring biasing the second pressing member toward the second recess, wherein the second pressing member at least partially engages the second recess when the saw unit is vertically positioned, or substantially vertically positioned, relative to the base.*

*19. A miter saw as in claim 18, further comprising a support shaft rotatably supporting the base side member and the saw unit side member.*

*20. A miter saw as in claim 18, further comprising a lock screw adapted to releasably lock the saw unit side member relative to the base side member.*

*21. A miter saw as in claim 18, wherein the second recess has a closed bottom.*

*22. A miter saw as in claim 18, wherein the angle Y is slightly greater than angle X.*

*23. A miter saw as in claim 22, wherein one of the first recess and the second recess is disposed slightly radially inward from the other of the first recess and the second recess.*

*24. A miter saw as in claim 18, wherein the second recess is a through hole having a diameter smaller than the first diameter of the first recess.*

*25. A miter saw as in claim 24, wherein the second compression spring has a greater biasing force than the first compression spring.*

*26. A miter saw, comprising:*

*a base adapted to support a workpiece,*

*a support shaft secured to the base,*

*a saw unit pivotable about the support shaft from a left bevel angle position through a vertical position to a right bevel angle position and vice versa,*

*a first pressing member selected from the group consisting of a ball and a hemispherical pin,*

*a second pressing member selected from the group consisting of a ball and a hemispherical pin,*

*a first compression spring substantially horizontally disposed between the first pressing member and one of the base and the saw unit, wherein the first pressing member is biased towards the other of the base and the saw unit,*

*a second compression spring disposed between the second pressing member and one of the base and the saw unit, wherein the second pressing member is biased towards the other of the base and the saw unit, and*

*a substantially vertically oriented abutting surface defined by the other of the base and the saw unit, wherein the first pressing member (1) engages a first recess in the abutting surface in order to releasably secure the saw unit in the vertical position and (2) disengages from the first recess upon application of a lateral force to the saw unit, and the second pressing member engages a second recess defined in the abutting surface when the saw unit is in the vertical position, and wherein the first pressing member and second pressing member are disposed slightly farther apart than the first recess and the second recess.*

*27. A miter saw as in claim 26, wherein the second recess has a closed bottom.*

*28. A miter saw as in claim 26, wherein one of the first recess and the second recess is disposed slightly radially inward from the other of the first recess and the second recess.*

*29. A miter saw as in claim 26, wherein the center of the first pressing member and the center of the second pressing member are angularly displaced by an angle X about a pivotal axis of the support shaft, and the center of the first recess and the center of the second recess are angularly displaced by an angle Y, which is different from said angle X.*

*30. A miter saw as in claim 26, wherein the second recess has a bottom on which the second pressing member abuts when the second pressing member at least partially engages the second recess.*

*31. A miter saw as in claim 26, wherein the first pressing member and the second pressing member have the same diameter, the first recess and the second recess are through holes, the diameter of the second recess is less than the diameter of the first recess, and the biasing force of the second compression spring is less than the biasing force of the first compression spring.*

*32. A compound miter saw comprising:*

*a base,*

*a turntable rotatably supported on the base and adapted to support a workpiece,*

*a support arm pivotally secured to the base,*

*a saw unit coupled to the support arm and capable of pivoting with respect to the turntable from a left bevel angle position through a vertical position to a right bevel angle position and vice versa,*

*a first ball,*

*a first compression spring substantially horizontally disposed between the first ball and one of the base and the saw unit, wherein the first ball is biased towards the other of the base and the saw unit,*

*a substantially vertically oriented abutting surface defined by the other of the base and the saw unit, wherein a first recess is defined within the abutting surface, the diameter of the first ball being greater than the diameter of the first recess, and wherein the first ball (1) only partially engages the first recess in the vertical position in order to releasably retain the saw unit in the vertical position and (2) disengages from the first recess upon application of a lateral force to the saw unit,*

*a second ball and*

*a second compression spring substantially horizontally disposed between the second ball and one of the base and the saw unit, wherein the second compression spring biases the second ball towards the other of the base and the saw unit, wherein a second recess is defined in the abutting surface, the diameter of the second ball is greater than the diameter of the second recess and the first ball and second ball are disposed slightly farther apart than the first recess and the second recess.*

*33. A compound miter saw as in claim 32, wherein the second ball (1) only partially engages the second recess in order to releasably retain the saw unit in the vertical position and (2) disengages from the second recess upon application of a lateral force to the saw unit.*

*34. A compound miter saw as in claim 32, wherein one of the first recess and the second recess is disposed slightly radially inward from the other of the first recess and the second recess.*

*35. A miter saw as in claim 32, wherein the center of the first ball and the center of the second ball are angularly displaced by an angle X with respect to a pivotal axis of the support arm, and the center of the first recess and the center of the second recess are angularly displaced by an angle Y, which angle Y is different from said angle X.*

*36. A miter saw as in claim 32, wherein the first ball and the second ball have the same diameter, the first recess and the second recess are through holes, the diameter of the second recess is smaller than the diameter of the first recess, and the biasing force of the second compression spring is less than the biasing force of the first compression spring.*

*37. A compound miter saw as in claim 36, wherein one of the first recess and the second recess is disposed slightly radially inward from the other of the first recess and the second recess, the center of the first ball and the center of the second ball are angularly displaced by an angle X with respect to a pivotal axis of the support arm, and the center of the first recess and the center of the second recess are angularly displaced by an angle Y, which angle Y is different from said angle X.*

* * * * *